(12) United States Patent
Singh et al.

(10) Patent No.: US 6,814,487 B2
(45) Date of Patent: Nov. 9, 2004

(54) APPARATUS FOR MEASURING INTERNAL TEMPERATURES OF FOOD PATTIES

(75) Inventors: Rajinder Paul Singh, Davis, CA (US); Jane Kee Kim, San Jose, CA (US); Linh My Dang, Leeds (GB)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 10/371,543

(22) Filed: Feb. 20, 2003

(65) Prior Publication Data

US 2004/0165647 A1 Aug. 26, 2004

(51) Int. Cl.[7] .............................................. G01K 13/00
(52) U.S. Cl. ....................... 374/208; 374/155; 374/149
(58) Field of Search ................................. 374/141, 149, 374/155, 208; 33/1 M; 99/467; 269/47, 55, 60; 414/749.1

(56) References Cited

U.S. PATENT DOCUMENTS

| | | | |
|---|---|---|---|
| 2,189,123 A | * | 2/1940 | Barker ........................ 374/155 |
| 2,510,526 A | * | 6/1950 | Smith ......................... 374/155 |
| 2,826,071 A | * | 3/1958 | Weksler ...................... 374/155 |
| 3,373,611 A | * | 3/1968 | Trott .......................... 374/155 |
| 3,479,876 A | * | 11/1969 | Kliewer ...................... 374/155 |
| 3,504,544 A | | 4/1970 | Tymkewicz |
| 3,511,167 A | * | 5/1970 | Holtkamp .................... 374/155 |
| 3,552,210 A | | 1/1971 | Wright, Jr. |
| 3,651,405 A | | 3/1972 | Whitney et al. |
| 3,849,622 A | * | 11/1974 | Merriam ...................... 374/155 |
| 4,059,997 A | * | 11/1977 | Trott .......................... 374/155 |
| 4,381,439 A | * | 4/1983 | Miyazawa et al. .......... 374/155 |
| 4,580,909 A | | 4/1986 | McIntosh |
| 4,967,049 A | * | 10/1990 | Kaneshiro et al. .......... 374/149 |
| 5,043,547 A | * | 8/1991 | Lee ............................ 374/149 |
| 5,634,719 A | | 6/1997 | La Neve |
| 5,712,466 A | | 1/1998 | Spicer |
| 6,142,297 A | * | 11/2000 | Price .......................... 374/208 |
| 6,412,398 B1 | | 7/2002 | Norcross et al. |
| 6,539,842 B1 | * | 4/2003 | Chapman et al. ........... 374/155 |
| 2002/0009121 A1 | * | 1/2002 | Siu ............................. 371/141 |
| 2002/0039379 A1 | * | 4/2002 | Ukai .......................... 374/141 |
| 2003/0007544 A1 | * | 1/2003 | Chang et al. ............... 374/149 |

* cited by examiner

*Primary Examiner*—G. Bradley Bennett
(74) *Attorney, Agent, or Firm*—John P. O'Banion

(57) ABSTRACT

An apparatus for measuring internal temperatures of food patties that includes a drawer sled slidably mounted on a pair of shafts. The drawer sled is formed with a drawer cavity that is sized and shaped to receive a food patty. Moreover, the drawer sled is movable between a loading/unloading position and a temperature measuring position. In the loading/unloading position a food patty can be inserted into or removed from the drawer cavity. Conversely, in the temperature measuring position, one or more temperature probes are inserted radially into the food patty such that one of the temperature probes detects the temperature of the food patty at its geometric center.

47 Claims, 3 Drawing Sheets

APPARATUS FOR MEASURING INTERNAL TEMPERATURES OF FOOD PATTIES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A COMPUTER PROGRAM APPENDIX

Not Applicable

NOTICE OF MATERIAL SUBJECT TO COPYRIGHT PROTECTION

Not Applicable

BACKGROUND OF THE INVENTION

1. Field of the Invention

This invention pertains generally to devices for measuring food temperatures, and more particularly to devices for measuring internal temperatures of food patties.

2. Description of the Background Art

When cooking hamburgers and other food patties, it is critical to obtain a certain final temperature to prevent illness. The United States Department of Agriculture (USDA) and the Food and Drug Administration (FDA) have provided guidelines that specify the temperatures values at the center of food patties that must be reached at the end of cooking in order to destroy any pathogenic microorganisms.

Measuring the internal temperature of a food patty such as a hamburger patty, a chicken patty, or a vegetable burger patty, can be difficult. For example, many commercial hamburger patties are approximately ten centimeters (10 cm) in diameter and typically vary in thickness from approximately seven millimeters (7 mm) to approximately twelve millimeters (12 mm). Typically, a hand-held device having a long, thin probe is used to measure the internal temperature of a food patty. In order to properly determine the internal temperature of the food patty, a user must insert the probe into the geometric center of the food patty; namely, at a location within the patty equal to one-half the thickness of the patty from the surface of the patty along its central axis. It is important that the probe is inserted to the geometric center of the food patty because, when the patty is heated from two sides during cooking, the slowest heating point is the geometric center of the food patty. Unfortunately, it can be extremely difficult to accurately insert the measuring tip of a temperature probe to the geometric center of the food patty. This can result in inaccurate and unreliable temperature values, particularly with thinner patties where temperature measurement errors are more pronounced.

For example, research has shown that if the measuring tip of a temperature probe is only one millimeter (1 mm) from the geometric center of the food patty, the temperature difference can be as great as ten degrees Celsius (10° C.). The resulting error in the temperature measurement is unacceptable because the FDA requires that hamburger patties must be cooked to a center temperature of sixty eight degrees Celsius (68° C.). Currently, many fast-food establishments set the operating conditions of their cooking grills by manually measuring the center temperature of a sample of food patties at the start of every work shift. Due to the above-described errors in manual measurement, operators can unknowingly set grill conditions that can result in either overcooking or undercooking of the food patties. Overcooking simply impairs the quality of the food patties. Undercooking, on the other hand, can jeopardize the health of anyone who consumes an undercooked food patty.

Accordingly, the present invention seeks to overcome the prior art drawbacks, and has provided the below-disclosed solutions to one or more of the prior art deficiencies.

BRIEF SUMMARY OF THE INVENTION

The present invention is an apparatus for measuring internal temperatures of food patties. According to an aspect of the invention, the apparatus includes a temperature probe and a drawer sled for holding a food patty. The drawer sled is movable between a loading/unloading position and a temperature measuring position. In the loading/unloading position, a food patty can be loaded into the drawer sled or unloaded from the drawer sled. Conversely, in the temperature measuring position, the temperature probe is inserted into the food patty. The temperature probe is inserted into the food patty radially (e.g., longitudinally along the patty) to overcome the above-described deficiencies with prior temperature measuring devices were the temperature probe is inserted axially.

In accordance with another aspect of the invention, the apparatus preferably includes a base plate. A first end plate and a second end plate are attached to the base plate. A shaft is installed between the first and second end plates and the drawer sled slides back and forth on the shaft between the first and second end plates. Preferably, a drive screw is engaged with the drawer sled. The drive screw is rotatable to slide the drawer sled along the shaft. Additionally, a motor is mechanically coupled to the drive screw and can be energized to rotate the drive screw.

According to a still further aspect of the invention, the apparatus includes a first limit switch and a second limit switch. The first limit switch can be toggled to de-energize the motor when the drawer sled reaches the temperature measuring position. On the other hand, the second limit switch can be toggled to de-energize the motor when the drawer sled reaches the loading/unloading position.

Preferably, a drawer cavity is established within the drawer sled. The drawer cavity is cylindrically shaped to receive a generally cylindrically shaped food patty. Further, a spacer, made from a material having a low thermal conductivity, can be disposed within the drawer cavity. In a preferred embodiment, the apparatus includes a temperature probe brush that is installed in the drawer sled. As the drawer sled moves back and forth along the shaft, the temperature probe slides through the temperature probe brush. Also, a temperature meter is connected to the temperature probe.

Another aspect of the invention is a method for measuring internal temperatures of food patties comprising inserting a central temperature probe radially into a food patty until the temperature probe reaches a geometric center of the food patty. Once the temperature probe is inserted in the food patty, an internal temperature of the food patty is measured at the geometric center of the food patty.

According to still another aspect of the invention, the apparatus includes means for measuring temperature and means for supporting a food patty. The means for supporting the food patty is movable between a loading/unloading position and a temperature measuring position. In the loading/unloading position, a food patty can be loaded into the means for supporting or unloaded from the means for supporting. Conversely, in the temperature measuring position, the means for measuring temperature is inserted into the food patty.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENT(S) OF THE INVENTION

Figure 1:
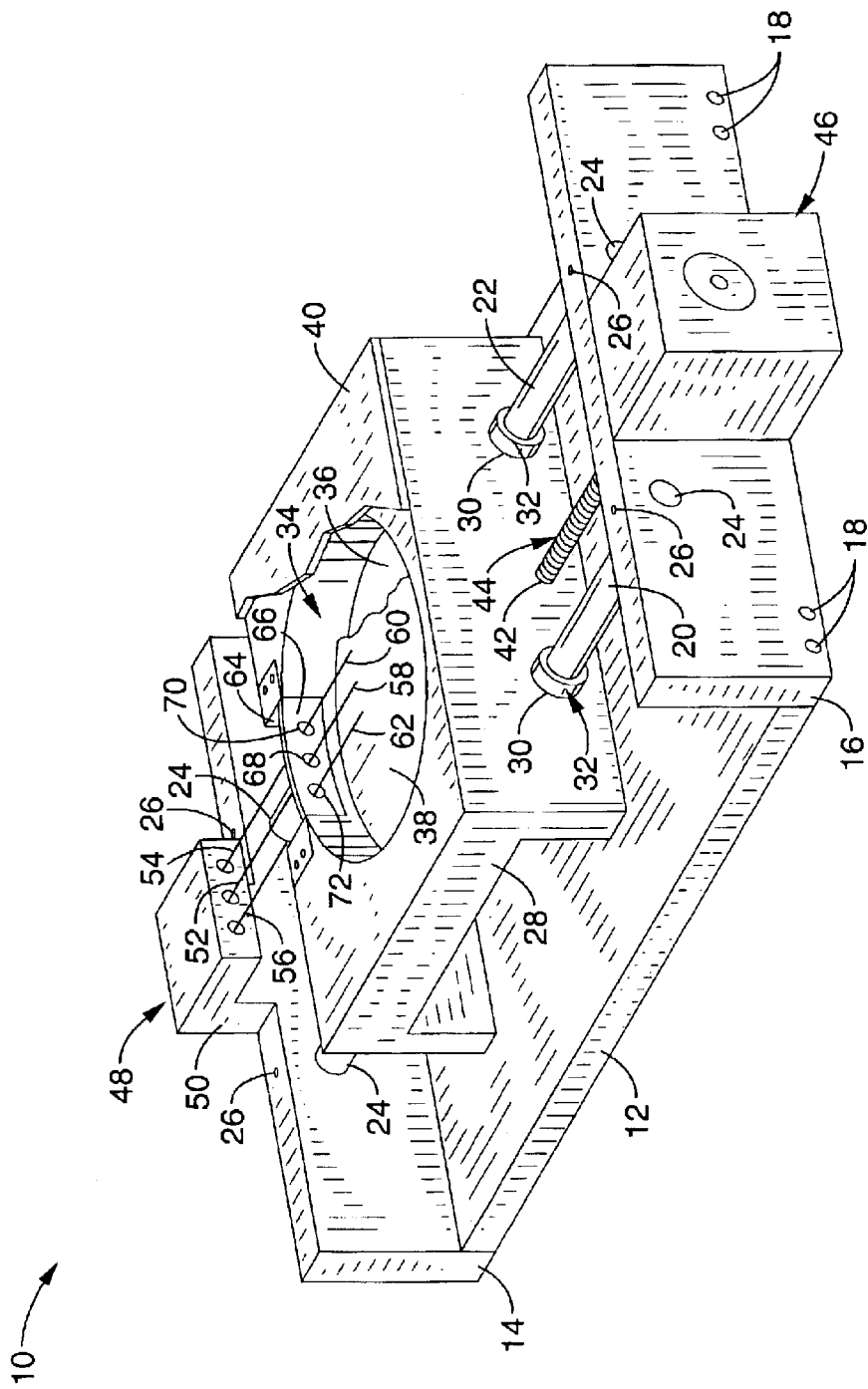
FIG. 1 is a perspective view of an apparatus for measuring internal temperatures of food patties according to the present invention.
Figure 2:
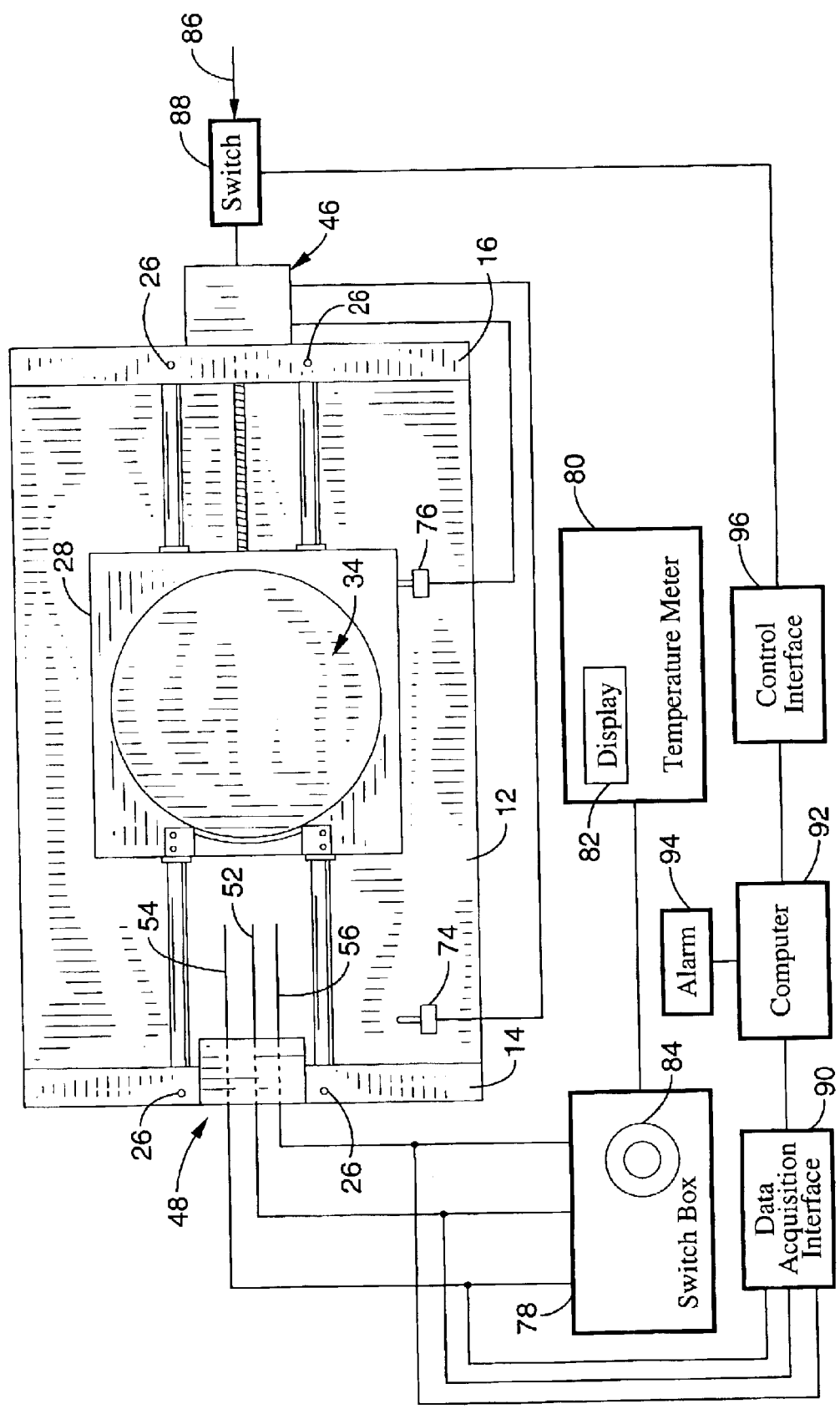
FIG. 2 is a top plan view of the apparatus of FIG. 1 shown in the loading/unloading position.
Figure 3:
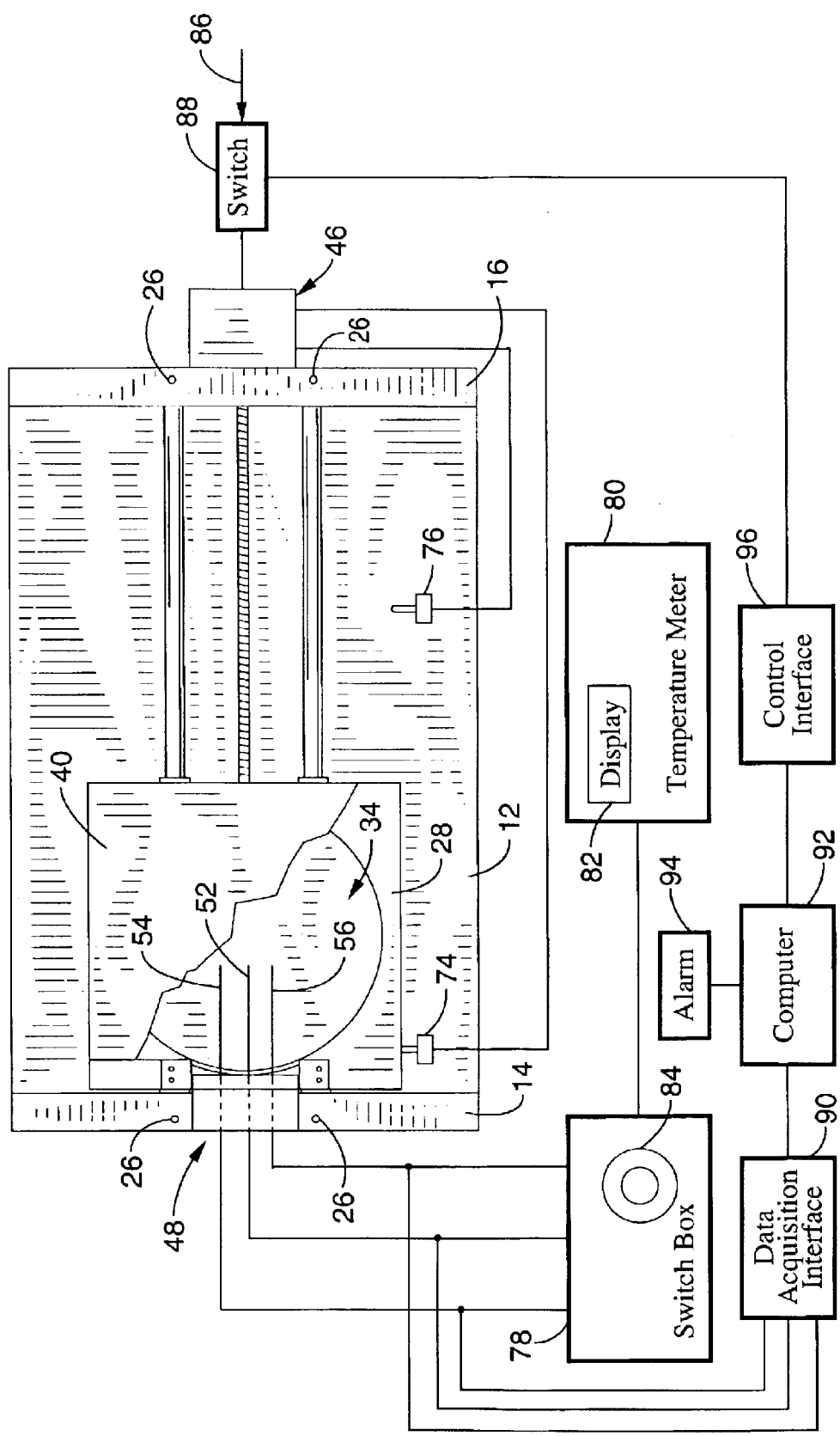
FIG. 3 is a top plan view of the apparatus of FIG. 1 in the temperature measuring position.

Referring more specifically to the drawings, for illustrative purposes the present invention is embodied in the apparatus generally shown in FIG. 1 through FIG. 3. It will be appreciated that the apparatus may vary as to configuration and as to details of the parts, and that the method may vary as to the specific steps and sequence, without departing from the basic concepts as disclosed herein.

Referring initially to FIG. 1, an apparatus for measuring internal temperatures of food patties is shown and is generally designated 10. FIG. 1 shows that the apparatus 10 includes a base plate 12 to which a first end plate 14 and a second end plate 16 are attached, such as by threaded fasteners 18. A generally cylindrical first shaft 20 and a generally cylindrical second shaft 22 are installed between the end plates 14, 16 such that they are parallel to each other and perpendicular to the end plates 14, 16. Preferably, each shaft 20, 22 is precision grounded from hardened steel. As shown in FIG. 1, each end plate 14, 16 is formed with preferably two shaft bores 24 that are sized to receive the respective ends of the shafts 20, 22. Moreover, a threaded bore (not shown) is formed perpendicular to each shaft bore 24 and a threaded set screw 26 is threadably engaged with each threaded bore. Each set screw 26 can be tightened in order to prevent the ends of the shafts 20, 22 from slipping out of respective shaft bores 24.

FIG. 1 shows a drawer sled 28 that is slidably disposed on the shafts 20, 22. Preferably, the drawer sled 28 is constructed from aluminum, but any other sufficiently durable material well known in the art can be used. In a preferred embodiment, the drawer sled 28 is formed with four bearing bores 30 and a linear ball bearing set 32 is press fitted into each bearing bore 30. As shown in FIG. 1, the drawer sled 28 is formed with a generally cylindrical drawer cavity 34 having a bottom 36. The bottom 36 of the drawer cavity 34 is lined with a thin sheet of low thermal conductivity material, such as Teflon®, in order to retain the heat and moisture from a food patty placed within the drawer cavity 34.

It can be appreciated that the dimensions of the drawer cavity 34 can be based on the measurements of a food patty (e.g., a quarter-pound hamburger). Also, since the depth of drawer cavity 34 is fixed, food patties of various thicknesses can be accommodated by placing one or more generally disk-shaped spacers 38 of appropriate is thickness on the bottom 36 of the drawer cavity 34. To prevent heat and moisture loss, the spacer 38 can preferably be made from a low thermal conductivity material such as Teflon®. Also, note that use of spacers 38 to accommodate different thickness patties also serves another purpose. Depending on the thickness of the patty, the spacer thickness allows the patty to be positioned so that the temperature probes can be inserted at the center of the axial thickness of the patty as will be discussed below.

FIG. 1 further shows a cover 40 disposed on top of the drawer sled 28 to enclose the drawer cavity 34. In a preferred embodiment, the cover 40 is also made from a material having a low thermal conductivity such as Teflon®. The cover 40 helps minimize heat loss and moisture loss and restrain the food patty in the drawer cavity 34 when the temperature probes, described below, are inserted into the food patty. It can be appreciated that the vertical wall of the drawer cavity can be lined with a material having a low thermal conductivity, such as Teflon®, but since heat transfer occurs dominantly in the axial direction, lining the vertical wall of the drawer cavity 34 is not required.

Still referring to FIG. 1, it is shown that the drawer sled 28 is formed with a threaded bore 42 that is sized and shaped to receive a correspondingly threaded drive screw 44. Preferably, the drive screw 44 can be mechanically coupled to a direct current (DC) motor 46 that is used to rotate the drive screw 44 in either direction by reversing the polarity of the power supply to the motor. It can be appreciated that the drive screw 44 can be directly coupled to the motor 46 or it can be coupled to the motor via a gear set. When the drive screw 44 is rotated in one direction, the drawer sled 28 moves towards the first end plate 14. On the other hand, when the drive screw 44 is rotated in the opposite direction, the drawer sled 28 moves toward the second end plate 16. It can be appreciated that, in lieu of a drive screw 44 and a motor 46, a user can manually slide the drawer sled 28 along the shafts 20, 22 between the end plates 14, 16.

FIG. 1 further shows that the apparatus for measuring internal temperatures of food patties 10 includes a temperature probe array 48 that includes a generally "L" shaped temperature probe support bracket 50 that extends from the first end plate 14 of the apparatus 10. Preferably, the temperature probe array 48 includes a central hypodermic-type temperature probe 52 that is flanked by an upper hypodermic-type temperature probe 54 and a lower hypodermic-type temperature probe 56. Each temperature probe 52, 54, 56 includes a respective sensing tip 58, 60, 62.

As shown in FIG. 1, the temperature probes 52, 54, 56 extend from the support bracket 50 and are arranged so that when the drawer sled 28 is in a temperature measuring position, described in detail below, the tips 58, 60, 62 of the probes 52, 54, 56 extend into the center of the drawer cavity 34 and therefore, into the center of a food patty placed within the drawer cavity 34. Specifically, in a preferred embodiment, the tip 58 of the central temperature probe 52 extends directly into the geometric center of a food patty placed within the drawer cavity. Preferably, the tip 60 of the upper hypodermic temperature probe 54 extends into the food patty at a location slightly distanced from the geometric center of the food patty, e.g., the upper temperature probe 54 is arranged so that its tip 60 extends to a position within the food patty that is one millimeter (1 mm) lateral to the tip 58 of the central temperature probe 52 and one millimeter (1 mm) above the tip 58 of the central temperature probe 52.

Moreover, in a preferred embodiment, the tip 62 of the lower hypodermic temperature probe 56 extends into the food patty at a location opposite the tip 60 of the upper hypodermic temperature probe 54; e.g., the lower temperature probe 56 is arranged so that its tip 62 extends to a position within the food patty that is one millimeter (1 mm) lateral to the tip 58 of the central temperature probe 52 and one millimeter (1 mm) below the tip 58 of the central temperature probe 52. Accordingly, the tips 58, 60, 62 of the temperature probes 52, 54, 56 are arranged such that when they are inserted into a food patty that is placed in the drawer cavity 34, the tips 58, 60, 62 of the temperature probes 52, 54, 56 create a diagonal pattern that passes through the geometric center of the food patty.

Depending on the thickness of the patty, different thickness spacers 38 can be used so that the patty is properly positioned in relation to the problems for measurement of the center temperature of the patty. For example, if a 7 mm thick patty is to be measured, a thicker spacer 38 would be used so that the central temperature probe 52 is inserted along the central axis of the patty, in comparison with an 11 mm patty where a thinner spacer would be used for the same purpose. Therefore, by varying the thickness of the spacer, a range patty thicknesses can be accommodated while still being able to measure the center temperature.

FIG. 1 shows that the drawer sled 28 establishes a lateral drawer opening 64 that leads to the drawer cavity 34. The lateral drawer opening 64 is sized and shaped to partially receive the temperature probe support bracket 50 when the drawer sled 28 is moved toward the first end plate 14. A drawer piece 66 is installed in the lateral drawer opening 64 in order to completely enclose the sidewall of the drawer cavity 34. Preferably, the drawer piece 66 is curved to match the radius of curvature of the drawer cavity 34.

As shown in FIG. 1, a central temperature probe brush 68, an upper temperature probe brush 70, and a lower temperature probe brush 72 are removably engaged with the drawer piece 66. The brushes 68, 70, 72 are arranged to allow each temperature probe 58, 60, 62 to pass through a respective brush 68, 70, 72. Accordingly, when the drawer sled 28 is moved back and forth between the first end plate 14 and the second end plate 16, the brushes 68, 70, 72 can brush along the temperature probes 58, 60, 62 and thereby clean the probes as the probes move into and out of a food patty placed in the drawer cavity 34. In a preferred embodiment, the brushes 68, 70, 72 are disposable and can be easily removed and replaced.

Referring now to FIG. 2, it can be seen that temperature measuring apparatus 10 includes a first limit switch 74 and a second limit switch 76. As the drawer sled 28 approaches the first end plate 14, it can toggle the first limit switch 74 in order to de-energize the motor 46 and prevent the drawer sled 28 from impacting the first end plate 14. Conversely, as the drawer sled 28 approaches the second end plate 16, it can toggle the second limit switch 76 in order to de-energize the motor 46 and prevent the drawer sled 28 from impacting the second end plate 16.

FIG. 2 shows that each temperature probe 52, 54, 56 is connected to a switchbox 78 which, in turn, is connected to a temperature meter 80. The temperature meter 80 includes a display 82, such as a liquid crystal display (LCD), that can be used to display the temperature sensed by the temperature probes 52, 54, 56. In a preferred embodiment, the switchbox 78 can include a knob 84 that allows a user to choose which temperature probe 52, 54, 56 is outputting a temperature signal to the temperature meter 80. As shown in FIG. 2, the motor 46 includes a power cord 86 that can be connected to a standard power source (e.g., 12 volts DC) and activated by a toggle switch 88.

It will be appreciated that using a temperature meter 80 with a display 82 to monitor the temperature requires visual monitoring; that is, a manual determination of whether the proper temperature has been reached. Alternatively, temperature meter 80 can be replaced with, or supplemented by, an automatic temperature monitoring system. For example, the output signals from the temperature probes could be connected to a conventional data acquisition interface 90 that is in turn connected to a computer 92. In this configuration, when a temperature reaches above a preselected value, an alarm 94 is activated. Alarm 94 could be a visual alarm such as a bright flashing light, an audible alarm, or both. A control interface 96 could also be connected between switch 88 and the computer 92 so that drawer sled 28 is automatically retracted when the proper temperate is reached.

FIG. 2 shows temperature measuring apparatus 10 in the loading/unloading position. In the loading/unloading position, the drawer sled 28 is distanced from the temperature probe array 48 such that none of the temperature probes 52, 54, 56 extend into the drawer cavity 34. Thus, a food patty (not shown) can be loaded into the drawer cavity 34 or removed therefrom. Preferably, when the drawer sled 28 reaches the loading/unloading position, the drawer sled 28 toggles the second limit switch 76 in order to de-energize the motor 46 and stop the drawer sled 28 from sliding along the shafts 20, 22.

Once a food patty is properly loaded into the drawer cavity 34, the motor 46 can be energized to rotate the drive screw 44 to move the drawer sled 28 toward the first end plate 14. When the drawer sled 28 reaches the temperature measuring position, as shown in FIG. 3, it toggles the first limit switch 74 to de-energize the motor 46 and stop the drawer sled 28. As the drawer sled 28 approaches the first end plate 14, the temperature probes 52, 54, 56 pass through the drawer piece 66, specifically the brushes 68, 70, 72, and enter the food patty radially, i.e., from the outer periphery of the food patty toward the center of the food patty, until the drawer sled 28 reaches the temperature measuring position. In the temperature measuring position, the tip 58 of the central probe 52 is located at the geometric center of the food patty and the tips 60, 62 of the upper and lower probes 54, 56 are slightly spaced therefrom. When the proper temperature is reached, motor 46 can be energized to retract drawer sled 28.

EXAMPLE

The above-described apparatus was constructed for a quarter-pound hamburger patty 12.5 mm thick and 104 mm in diameter. Drawer sled 28 was constructed from a square aluminum block 5.5, by 5.5". Shafts 20, 22 were ⅜" outer diameter by 15" long shafts 20, 22 and bearings 32 were ⅜" inner diameter closed steel bearings. Screw 44 was an 8–32 all threaded rod. Temperature probes 52, 54, 56 were hypodermic-type temperature probes available from Omega Co. comprising a very fine thermocouple located inside a hypodermic needle with the measuring tip at the insertion point of the needle. The bottom 36 of cavity 34 was lined with ⅛" thick Teflon®. Internal temperatures were measured by the three probes for fifteen hamburger patties cooked on a clam-shell grill and held for one minute after removal from the grill. During the one-minute holding period it was found that heat continues to transfer to the center of the patty. The center reached a final temperature, and subsequently, locations away from the center began to cool as the heat transferred out of the patty to the surrounding ambient. Therefore, after a one-minute holding period, it was found that the center of the patty was at the highest temperature whereas locations away from the center were at lower temperatures.

Accordingly, the temperature probe array 48 can obtain an accurate temperature at the geometric center of a food patty and obtain two temperatures slightly distanced therefrom in order to further ensure the accuracy of the measurement taken at the geometric center of the food patty. Moreover, temperature measuring apparatus 10 can be used to consistently take temperature measurements at the geometric center of food patties and eliminate the operator error associated with taking manual temperature measurements within the food patties. As such, food safety is maximized and product wastage is minimized.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for measuring internal temperatures of food patties, comprising:
   at least one temperature probe; and
   at least one drawer sled having a drawer cavity;
   wherein said drawer sled is movable alone a sliding axis defined by a loading/unloading position wherein a food patty can be loaded into the drawer sled or unloaded from the drawer sled and a temperature measuring position wherein the temperature probe is inserted into said drawer cavity along the sliding axis.

2. An apparatus as recited in claim 1, further comprising:
   a base plate;
   a first end plate attached to the base plate;
   a second end plate attached to the base plate; and
   at least one shaft installed between the first and second end plates, said shaft being parallel to the sliding axis;
   said drawer sled configured to slide back and forth on the shaft between the first and second end plates.

3. An apparatus as recited in claim 2, further comprising:
   at least one drive screw configured to engage the drawer sled;
   said drive screw being rotatable to slide the drawer sled along the shaft.

4. An apparatus as recited in claim 3, further comprising:
   at least one motor mechanically coupled to the drive screw;
   said motor being energizable to rotate the drive screw.

5. An apparatus as recited in claim 4, further comprising:
   a first limit switch;
   said first limit switch configured to de-energize the motor when the drawer sled reaches the temperature measuring position.

6. An apparatus as recited in claim 5, further comprising:
   a second limit switch;
   said second limit switch configured to de-energize the motor when the drawer sled reaches the loading/unloading position.

7. An apparatus as recited in claim 4, further comprising:
   a data acquisition interface connected to said temperature probe;
   a data control interface connected to said motor; and
   a computer connected to said data acquisition interface and to said data control interface;
   wherein said computer is configured to operate said motor to move said drawer sled to the loading/unloading position when a predetermined temperate has been sensed by said temperate probe.

8. An apparatus as recited in claim 1, wherein the drawer cavity is cylindrically shaped to receive a generally cylindrically shaped food patty.

9. An apparatus as recited in claim 8, further comprising:
   a spacer disposed within the drawer cavity.

10. An apparatus as recited in claim 9, wherein the spacer comprises a material having a low thermal conductivity.

11. An apparatus as recited in claim 1, further comprising:
    at least one temperature probe brush;
    said temperature probe brush positioned in the drawer sled such that as the drawer sled moves between the loading/unloading position and the temperature measuring position the temperature probe slides through the temperature probe brush.

12. An apparatus as recited in claim 1, further comprising:
    at least one temperature meter connected to the temperature probe;
    said temperature meter including a display for displaying at least one internal temperature of a food patty.

13. An apparatus as recited in claim 1, further comprising:
    an alarm configured to indicate when a predetermined temperature has been sensed by said temperature probe.

14. An apparatus as recited in clam 13, further comprising:
    a data acquisition interface connected to said temperature probe; and
    a computer connected to said data acquisition interface and to said alarm;
    wherein said computer is configured to activate said alarm at said predetermined temperature.

15. An apparatus for measuring internal temperature of a food patty comprising:
    a temperature probe array; and
    at least one drawer sled having a drawer cavity;
    wherein said drawer sled is movable along a sliding axis defined by a loading/unloading position wherein a food patty can be loaded into the drawer sled or unloaded from the drawer sled and a temperature measuring position wherein the temperature probe array is inserted into said drawer cavity along the sliding axis.

16. An apparatus as recited in clam 15, wherein the temperature probe array comprises:
   a central temperature probe;
   an upper temperature probe; and
   a lower temperature probe.

17. An apparatus as recited in claim 16:
   wherein each temperature probe includes a tip; and
   wherein when the drawer sled is in the temperature measuring position the tip of the central temperature probe is positioned to measure the temperature of a food patty at a geometric center of the food patty.

18. An apparatus as recited in claim 17, wherein when the drawer sled is in the temperature measuring position the tip of the upper temperature probe is positioned to measure a temperature of the food patty at a position distanced from the geometric center of the food patty.

19. An apparatus as recited in claim 17, wherein when the drawer sled is in the temperature measuring position the tip of the lower temperature probe is positioned to measure a temperature of the food patty at a position distanced from the geometric center of the food patty.

20. An apparatus as recited in claim 15, further comprising:
   a base plate;
   a first end plate attached to the base plate;
   a second end plate attached to the base plate; and
   at least one shaft installed between the first and second end plates, said shaft being parallel to the sliding axis;
   wherein the drawer sled slides back and forth on the shaft between the first and second end plates.

21. An apparatus as recited in claim 20, further comprising:
   at least one drive screw engaged with the drawer sled;
   said drive screw being rotatable to slide the drawer sled along the shaft.

22. An apparatus as recited in claim 21, further comprising:
   at least one motor mechanically coupled to the drive screw;
   said motor being energizable to rotate the drive screw.

23. An apparatus as recited in claim 22, further comprising:
   a first limit switch;
   said first limit switch configured to de-energize the motor when the drawer sled reaches the temperature measuring position.

24. An apparatus as recited in claim 23, further comprising:
   a second limit switch;
   said second limit switch configured to de-energize the motor when the drawer sled reaches the loading/unloading position.

25. An apparatus as recited in claim 16, further comprising:
   at least one temperature meter connected to the central temperature probe, the upper temperature probe, and the lower temperature probe;
   said temperature meter configured to display at least one internal temperature of a food patty.

26. An apparatus as recited in claim 25, further comprising:
   at least one switch box connected to the central temperature probe, the upper temperature probe, and the lower temperature probe;
   said switchbox including a knob to allow a user to switch between the central temperature probe, the upper temperature probe, and the lower temperature probe.

27. An apparatus as recited in claim 15, wherein the drawer cavity is cylindrically shaped to receive a generally cylindrically shaped food party.

28. An apparatus as recited in claim 27, further comprising:
   a spacer disposed within the drawer cavity.

29. An apparatus as recited in claim 28, wherein the spacer comprises a material having a low thermal conductivity.

30. An apparatus as recited in claim 16, further comprising:
   a central temperature probe brush;
   an upper temperature probe brush; and
   a lower temperature probe brush;
   wherein said temperature probe brushes are positioned in the drawer sled such that as the drawer sled moves between the loading/unloading position and the temperature measuring position, each temperature probe slides through a respective temperature probe brush.

31. An apparatus as recited in claim 15, further comprising:
   an alarm configured to indicate when a predetermined temperature has been sensed by said temperature probe.

32. An apparatus as recited in claim 31, further comprising:
   a data acquisition interface connected to said temperature probe; and
   a computer connected to said data acquisition interface and to said alarm.

33. An apparatus as recited in claim 22, further comprising:
   a date acquisition interface connected to said temperature probe;
   a data control interface connected to said motor; and
   a computer connected to said data acquisition interface and to said data control interface;
   wherein said computer is configured to operate said motor to move said drawer sled to the loading/unloading position when a predetermined temperature has been sensed by said temperature probe.

34. A method for measuring internal temperatures of food patties comprising:
   moving a drawer sled along a sliding axis, the drawer sled having a cavity configured to accommodate a food patty; and
   mechanically inserting a central temperature probe into the food patty along a sliding axis from a perimeter of the food patty toward a geometric center of the food patty.

35. A method as recited in claim 34, further comprising:
   measuring at least one internal temperature at the geometric center of the food patty.

36. A method as recited in claim 35, further comprising:
   mechanically inserting an upper temperature probe into a into a food patty from the perimeter of the patty until the temperature probe reaches a position distanced from the geometric center of the food patty.

37. A method as recited in claim 36, further comprising:

mechanically inserting a lower temperature probe into a into a food patty from the perimeter of the patty until the temperature probe reaches a position distanced from the geometric center of the food patty.

38. A method as recited in claim 36, further comprising:

measuring at least one internal temperature at the position distanced from the geometric center of the food patty.

39. An apparatus for measuring internal temperatures of food patties, comprising:

a temperature probe; and means for holding at least one food patty that is movable along a sliding axis defined by a loading/unloading position wherein a food patty can be loaded or unloaded and a temperature measuring position wherein the temperature probe is inserted into the food patty along the sliding axis.

40. An apparatus as recited in claim 39, further comprising:

means for moving said means for holding at least one food patty between the loading/unloading position and the temperature measuring position.

41. An apparatus as recited in claim 40, further comprising:

means for stopping the means for holding at least one food patty in the temperature measuring position.

42. An apparatus as recited in claim 41, further comprising:

means for stopping the means for holding at least one food patty in the loading/unloading position.

43. An apparatus as recited in claim 39, further comprising:

means for cleaning the temperature probe as the means for holding at least one food patty moves between the loading/unloading position and the temperature measuring position.

44. An apparatus as recited in claim 39, further comprising:

means for displaying at least one internal temperature of a food patty.

45. An apparatus as recited in claim 39, further comprising:

an alarm configured to indicate when a predetermined temperature has been sensed by said temperature probe.

46. An apparatus as recited in clam 45, further comprising:

a data acquisition interface connected to said temperature probe; and a computer connected to said data acquisition interface and to said alarm.

47. An apparatus as recited in claim 40, further comprising:

a data acquisition interface connected to said temperature probe;

a data control interface connected to said means for moving said means for holding at least one food patty between the loading/unloading position and the temperature measuring position; and a computer connected to said data acquisition interface and to said data control interface;

wherein said computer is configured to move said means for holding at least one food patty to the loading/unloading position when a predetermined temperate has been sensed by said temperate probe.

* * * * *